(12) United States Patent
Powers et al.

(10) Patent No.: US 6,460,486 B1
(45) Date of Patent: *Oct. 8, 2002

(54) AESTHETICALLY APPEALING SQUARE-BACK ANIMAL CRATE

(75) Inventors: E. Michael Powers, Menasha, WI (US); Trygve M. Pederson; Chester Beavers, both of Plymouth, MN (US); W. Robert Worrell, Hopkins, MN (US); William Johnson, East Inver Grove Heights, MN (US); Thomas A. Tedham, Eden Prairie, MN (US)

(73) Assignee: Kennel-Aire, Inc., Plymouth, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,575

(22) Filed: Oct. 28, 1997

(51) Int. Cl.[7] ............................. A01K 1/02; A01K 31/06
(52) U.S. Cl. ....................................... 119/452; 119/474
(58) Field of Search ................................ 119/452, 453, 119/459, 461, 463, 472, 474, 480, 481, 482, 489, 491, 496, 498, 427, 431

(56) References Cited

U.S. PATENT DOCUMENTS

| 472,615 | A | * | 4/1892 | Cooper ....................... 119/474 |
| 2,759,622 | A | * | 8/1956 | Simmons et al. ....... 119/474 X |
| 4,256,056 | A | | 3/1981 | Sou |
| 4,901,672 | A | | 2/1990 | Rosenberger |
| 4,917,047 | A | | 4/1990 | Wazeter, III |
| 5,036,795 | A | | 8/1991 | Houghton |
| 5,452,681 | A | | 9/1995 | Ho |
| 5,462,015 | A | | 10/1995 | Murphy |
| 5,467,734 | A | | 11/1995 | Ho |
| 5,497,728 | A | * | 3/1996 | Watanabe ................ 119/452 |
| 5,544,619 | A | * | 8/1996 | Braun ...................... 119/474 |
| 5,549,073 | A | * | 8/1996 | Askins et al. ......... 119/461 X |
| 5,653,194 | A | * | 8/1997 | Guy ........................ 119/453 |

* cited by examiner

Primary Examiner—Peter M. Poon
Assistant Examiner—Son T. Nguyen
(74) Attorney, Agent, or Firm—Fredrikson & Byron, P.A.

(57) ABSTRACT

The present invention concerns animal kennels or crates that provide a means for housing, containing and training animals, and in particular, domesticated house pets such as dogs and cats. The crate is collapsible so that it can be disassembled and transported in a convenient fashion. The crate is comprised of side panels, end panels and a top panel that define the boundaries of the crate. These panels are secured together through the use of edge pieces that are strong enough to maintain the integrity of the crate when placed under the stresses associated with an animal trying to escape, while also being flexible enough to provide for an easy means of assembling and disassembling the crate. Corner caps are placed on the corners of the crate and a removable base can be clipped to the crate. The edge pieces and corner cap also provides the crate with an aesthetically appealing appearance that reduces the perception of crates being cruel to the animal.

10 Claims, 9 Drawing Sheets

AESTHETICALLY APPEALING SQUARE-BACK ANIMAL CRATE

FIELD OF THE INVENTION

The present invention relates generally to animal crates or kennels used for housing, training and maintaining dogs, cats and other pet animals. More particularly, the invention relates to a square-back animal crate that can be easily assembled and disassembled by the pet owner, that is strong enough to contain the animal without injury and that is aesthetically appealing.

BACKGROUND OF THE INVENTION

Animal crates represent an effective and humane method of pet management. The crates can be employed to house, contain and train most commonly found pets including dogs, cats, birds and rodents.

While commercial operations, such as veterinarians, professional kenneling businesses and humane societies, have popularly used animal crates for some time, pet owners have also discovered the value and benefits of using a crate in their homes. Among other things, a crate provides a pet owner with an appropriate space when the animal needs to be confined and assists in house training the animal. As many animals have territorial instincts, the crate also provides a secure "den" for them.

In order to be effective, however, a crate must be properly configured and meet certain criteria. Unfortunately, many existing crates lack critical features or suffer from other disadvantages that affect the sale of the crates, impair the ability of the pet owner to fully enjoy the crates or use them to the maximum benefit, injure the pet in extreme cases, as well as potentially lead to misperceptions on the part of consumers as to the humanitarian aspects of crates generally.

One primary disadvantage of existing crates stems from their necessary size. Many crates are very expansive structures so that they can properly house a large animal, such as many breeds of dogs, while providing the animal with sufficient room to maneuver. These crates require a lot of space which can have detrimental effects on both the pet owner and the retail seller of crates.

For instance, while many pet owners may have long term need for a crate, there are frequently times when the crate may need to be moved. Some pet owners, for example, may wish to relocate the crate or move the crate between the outside and the inside of the house so as to give the animal a more varied environment. Additionally, the pet owner may wish to take the animal along on a vacation, drop the animal off with someone that will care for it while the owner is away, or otherwise travel with the animal. Under such circumstances, it would be convenient for the pet owner to be able to transport the crate as well so that it could be used at the new location. The size and bulk of many prior art crates, however, render them quite awkward for transportation.

At other times, the pet owner may wish to temporarily store away the crate. Once again, most existing crates, even those intended for small animals, take up a significant amount of space, making them difficult to store.

The size and bulk of prior art crates also has a detrimental effect on the retailers and sellers of such items. Retailers of crates need to store multiple crates to have on hand as inventory and to display the crates to customers in their stores. The size of the crates means that a significant and vital amount of storage and display space is taken up by each crate.

Some in the industry have attempted to overcome these disadvantages by producing collapsible crates that can be manipulated to a smaller, flatter size or square-back crates which can be disassembled into smaller individual pieces when the crate is not in use, thereby making storage and transportation easier. Many of these prior art crates, however, suffer from disadvantages.

In order to be useful to pet owners, the collapsible and square-back crates must be relatively easy to assemble and disassemble. Thus, the method of constructing and taking apart the crate should be straight forward and easily understood by the pet owner. Likewise, the time to actually assemble and disassemble the crate should be short. Ideally, there should also be a minimum of components making up the crate. Too many components, particularly small ones, leads to the possibility that some of them could be lost. Furthermore, an excess of components, each with its own distinct characteristics, increases the complexity of the crate and furthers the likelihood that the pet owner may become confused when attempting to reassemble the crate. Finally, a large number of components increases the risk that the animal may loosen some and become injured.

Many of the prior art collapsible and square-back crates reflect these disadvantages. U.S. Pat. No. 5,452,681 and U.S. Pat. No. 5,467,734, both issued to Ho, for example, each refer to animal crates that consist of numerous parts. Many of the parts are small attachment pieces that fit together in a unique way and that could be easily lost or broken, thereby rendering the crate useless.

Another disadvantage found in many collapsible and square-back crates is their lack of integrity when placed under stress. Any crate should be able to prevent the unintended release of the animal, especially when the animal is actively attempting to escape the confines of the crate. Collapsible and square-back crates, however, are particularly susceptible to failure when the confined animal attacks the crate. By their nature, these crates are intended to come apart and thus, contain a variety of potential weak points that could fail under pressure applied by the animal or external factors.

A crate must be able to maintain its structural integrity and not allow the escape of the animal under a variety of circumstances. These include situations where particularly aggressive breeds may attack the crate in an effort to escape undesired confinement, as well escape efforts of animals due to fear (for example, trying to seek cover during a storm) or positive excitement (for example, attempting to reach its owner who has just come home from work).

Areas of a crate that are typically most vulnerable to failure are the door, where an animal might destroy or manipulate the latch, the edges of the crate, where the side panels are joined and where the animal may be able to leverage itself through, and the mesh or gauge design of the panels, where the animal could collapse or distort the structure. Furthermore, not only must the crate be able to withstand the efforts of an animal to break out but it also must maintain its integrity even against partial failure. If the animal is able to bite off or work loose portions of the crate, those pieces could be swallowed by the animal causing it to choke or otherwise become injured.

Similarly, the animal may hurt itself on exposed portions of the crate. Likewise, if the animal is able to create a gap or otherwise separate the side panels, the gap may not be big enough to allow for escape but could easily lead to the choking of the animal if the gap allows only the animal's head through.

Many of the prior art crates are constructed in ways that may be particularly prone to causing injury to the animal if they partially fail. For example, U.S. Pat. No. 4,917,047 issued to Wazeter refers to a knock-down crate that contains a number of small sharp components that assist in holding the side and top panels of the crate together. If the animal were to obtain access to these components, they could easily cause the animal to choke.

Similarly, U.S. Pat. No. 4,256,056 issued to Sou depicts a portable crate that also contains a number of small components. Once again, an animal could swallow these parts, break a tooth or otherwise become injured if the parts become exposed.

The base found in many crates frequently represents another disadvantage. This is true of both collapsible and square-back crates as well as those crates designed as permanent constructions. The base of a crate will frequently become soiled with urine and feces from the animal. Even for those animals that are completely trained not to defecate in the crate, the base will naturally become sullied with such waste as dirt, fur and slobber. The base may also become damp, either from the animal or through external factors. Thus, the pet owner will need to regularly clean the base of the crate.

The bases of many crates, however, are not well suited for cleaning. Some bases are permanently affixed to the bottom of the crate. This is extremely inconvenient for the pet owner as it requires the owner to clean the base by partially or wholly entering the crate or by moving the crate outdoors and attempting to wash the base through the crate.

Many crates have attempted to solve this problem by using a removable tray that is placed inside the crate for supposedly capturing all of the dirt and waste materials. The tray can be slid out of the crate, separately cleaned and then slid back into the bottom of the crate. These types of trays, however, represent a potential danger to the animal. The position of many of the trays in the crate leaves a gap between the walls of the crate and the tray. An animal could potentially use this gap to manipulate the tray which could result in the animal choking on a piece of a plastic or wooden tray that the animal is able to chew off. Even for metal trays, the animal may be able to maneuver the tray such that the paw or head of the animal could get stuck between the tray and the walls of the crate, thereby causing injury to the animal. Additionally, for collapsible and square-back crates, having a separate tray increases the number of parts and the complexity of the crate.

Some prior art trays have raised the entire crate and positioned the tray outside of the crate underneath the floor of the crate. Thus, the tray can be accessed by the pet owner but not the animal. The floor of such crates, however, can be uncomfortable for the animal to walk on and lie upon.

Finally, one disadvantage that can be found in virtually all varieties of crates is that they are frequently visually unattractive. While this issue may not initially seem to be of much concern, the lack of aesthetically appealing crate designs has practical consequences.

As previously mentioned, crates represent an efficient, as well as humane, method of containing and training a domestic animal. Many of the alternative methods of containing and training an animal do not work as well as the use of a crate. Thus, these methods can lead to frustration on the part of the pet owner as well as the pet and impair the enjoyment of the animal by the pet owner as well as the quality of life for the pet. As such, the use of crates is encouraged by the industry and acceptance of crates by the general public can be a critical factor in the enjoyment of animals by home owners and the well being of pets.

However, there is a prevalent negative opinion on the part of many consumers as to wire crates. Many pet owners perceive wire crates as cruel to animals or jail-like in application. The appearance and construction of wire crates presently available to consumers frequently reinforces this perception. Many prior art crates are produced in a fashion that minimizes the benefits of crates.

Therefore, there is a need for an animal crate that is easy to assemble and disassemble by the pet owner, maintains its integrity under typical stresses placed upon it by the animal and that encourages the general use of crates as a means of containing and training an animal. The present invention accomplishes these goals through the use of a square-back crate that is very flexible in its applications.

The crate uses a unique system of connecting the panels of the crate together through the use of uniform edge pieces so that the entire crate consists of a minimal amount of components. This system also allows the pet owner to easily and intuitively assemble and disassemble the crate. The crate also is very safe for the animal as the stresses that would be placed upon the crate by an animal trying to escape are distributed over the edge pieces. Thus, it is particularly difficult for the animal not only to escape from the crate, but also to weaken the crate and expose the components or separate the panels from the edge pieces.

Finally, the structure of the crate produces an aesthetically pleasing design that lessens the perception of animal crates being inhumane. The construction of the crate also represents a safer design as corners and ends of the crate are covered and inaccessible to both the animal, the pet owner and others who encounter the crate.

SUMMARY OF THE INVENTION

The present invention relates to an animal crate for use in containing, maintaining and training an animal, such as a domesticated pet. The crate is comprised of several parts, including, side panels, end panels and a top panel that form the exterior boundaries of the crate, a base that is attached to the bottoms of the side panels and end panels so that it can be removed from the crate, clips for securing the base to the side panels and end panels, a door providing for the entrance and egress of the animal, a latching mechanism for securing the door in a closed position, uniform edge pieces that secure together the side panels, end panels and top panels in a manner that allows for easy assembly and disassembly while being able to maintain the integrity of the connections even when faced with the typical stresses placed upon a crate by an excited animal, and corner caps positioned over the exposed corners of the crate formed at the intersections of the side panels, end panels and top panel.

The side panels, end panels and top panel are secured together by means of insertion into the edge pieces to form a generally rectangular shaped crate. If desired, the side panels, end panels and top panel can all be uniform in shape and size, thereby simplifying the construction of the crate and producing a crate that is generally square in shape. After the side panels, end panels and top panel are secured together, the corner caps are then placed at the intersection of these panels over the portion of the panels that remains exposed from the edge pieces.

One of the end panels contains an opening for conveying the animal in and out of the crate. A door with a latching mechanism is attached to this end panel so that the exit of the animal from the crate can be controlled by the pet owner. All of the latching mechanism parts are positioned outside of the crate in such a way that they are not accessible to the animal. This prevents the possibility of the animal being able to chew off any of the parts, thereby weakening the crate, destroying the latch or choking on the parts.

The base is attached to the bottom of the side panels and end panels through the use of clips. Thus, the base is clipped onto the bottom of the side panels and end panels in a temporary fashion. This allows the pet owner to remove the base for cleaning or other purposes and easily reattach it to the side panels and end panels. Corner caps can also be attached to the corners of the base. A separate tray, although not necessary, can also be used with the crate.

The design of the edge pieces and corner caps ensures that the crate can be easily assembled by the pet owner and can be easily disassembled should the pet owner need to transport the crate. The edge pieces also ensure that the side panels, end panels and top panel are secured together in a fashion that allows the crate to prevent the escape of an aggressive or excited breed. The design of the edge pieces and corner caps also results in softening the traditional harsh appearance of crates.

Thus, the crate is convenient for the pet owner to assemble, disassemble and clean, is strong enough to ensure the safety of the animal and promotes the use of crates as an effective and humane method of housing and training animals.

DETAILED DESCRIPTION OF THE INVENTION

As can be seen in FIGS. 1–17, the present invention concerns an animal kennel or crate 10. The crate 10 is suitable for housing, maintaining and training animals of various varieties. The crate 10 is particularly well suited for use with domestic house pets, such as dogs, cats and related creatures.

The crate 10 is extremely flexible in its applications as well as in its construction and design. Although the crate is appropriate for a wide variety of animals, references will frequently be made to domestic breeds of dogs. Such references are for illustrative purposes only and should not be viewed as limiting the application of the crate in any manner.

The materials from which the present invention is constructed can vary depending upon the desired application. The side panels 12, end panels 14, 16, top panel 18 and door 54 will generally be constructed of wire rods, as is commonly found in the industry currently. Similarly, the base 36, tray 38, clips 44, edge pieces 20, corner caps 30 and latch 56 will generally be constructed of an extruded plastic material. These material, however, only represent one particular embodiment. Other a materials may be appropriate or desired.

As previously discussed, the crate 10 is comprised of several components. In the preferred embodiment, these components include side panels 12, end panels 14, 16, a top panel 18, a base 36, a tray 38 positionable in the base 36, clips 44 for attaching the base 36 to the side panels 12 and end panels 14, 16, edge pieces 20, corner caps 30, a door 54 and a latch 56.

The dimensions of the side panels 12, end panels 14, 16 and top panel 18 can and will vary depending upon the desired size of the crate 10. In one embodiment, three sizes of crates 10 are available to pet owners with dimensions such that one of the crates will be appropriate for virtually any breed of dogs. Thus, a small crate would be for use with puppies and small breeds of dogs, a medium crate would be for use with partially grown dogs and mid-size breeds of dogs, and a large crate would be for use with fully grown large breeds of dogs.

Although the sizes of the small, medium and large crates can vary, in the preferred embodiment, the small crate is approximately twenty four inches high, twenty inches wide and thirty inches deep resulting in a volume for the crate of approximately eight cubic feet, while the large crate is approximately thirty inches high, twenty six inches wide and forty two inches deep resulting in a volume for the crate of approximately nineteen cubic feet. In an alternate embodiment, another crate is available for puppies or particularly small animals. Such a crate could have any appropriate dimensions but in the preferred embodiment, this crate is approximately twenty inches high, nineteen inches wide and twenty five inches deep, resulting in a volume for the crate of approximately five and a half cubic feet.

Hereinafter, the medium sized crate will be described in detail for illustrative purposes. It should be understood, however, that the applications of the medium sized crate apply to the small and large crate as well as a crate of any appropriate dimensions produced according to the present invention.

As previously mentioned, the side panels 12, end panels 14, 16 and top panel 18 can be of any appropriate dimension. In the preferred embodiment, however, each of the side panels 12 is approximately thirty six inches long and twenty nine inches high, each of the end panels 14, 16 is approximately twenty nine inches high and twenty four inches wide, and the top panel 18 is approximately thirty six inches long and twenty four inches wide. This results in a crate 10 with a volume of approximately fourteen and a half cubic feet.

In an alternate embodiment, the side panels 12, end panels 14, 16 and top panel 18 can all have approximately equal dimensions, thereby resulting in a crate 10 that is generally square shaped. This arrangement has the advantage of increasing the overall simplicity of the crate 10 for the pet owner during assembly and disassembly of the crate 10. As the side panels 12, end panel 14 without the door and top panel 18 are all essentially identical and interchangeable, the pet owner does not have to be concerned with placing one of them in the wrong position and need only address the issue of where the door should go.

However, a disadvantage of such an embodiment is that the crate typically has to be quite large to properly accommodate the needs of the pet. Crates are usually longer than they are wide so that the animal has sufficient space to move about. In order for a square crate to provide proper space, both the length and width of the crate would have to be large, thereby significantly increasing the overall size of the crate.

The side panels 12, end panels 14, 16 and top panel 18 can all be constructed of a variety of appropriate materials, such as metal, plastic or wood. The choice of the material can vary depending upon the factors that the manufacturer or consumer desire of the crate. Some of the criteria that are considered when producing or buying a crate are strength, durability, safety, cost and weight. Additionally, in alternate embodiments, the side panels 12, end panels 14, 16 and top panel 18 can be constructed of different materials.

Figure 1:
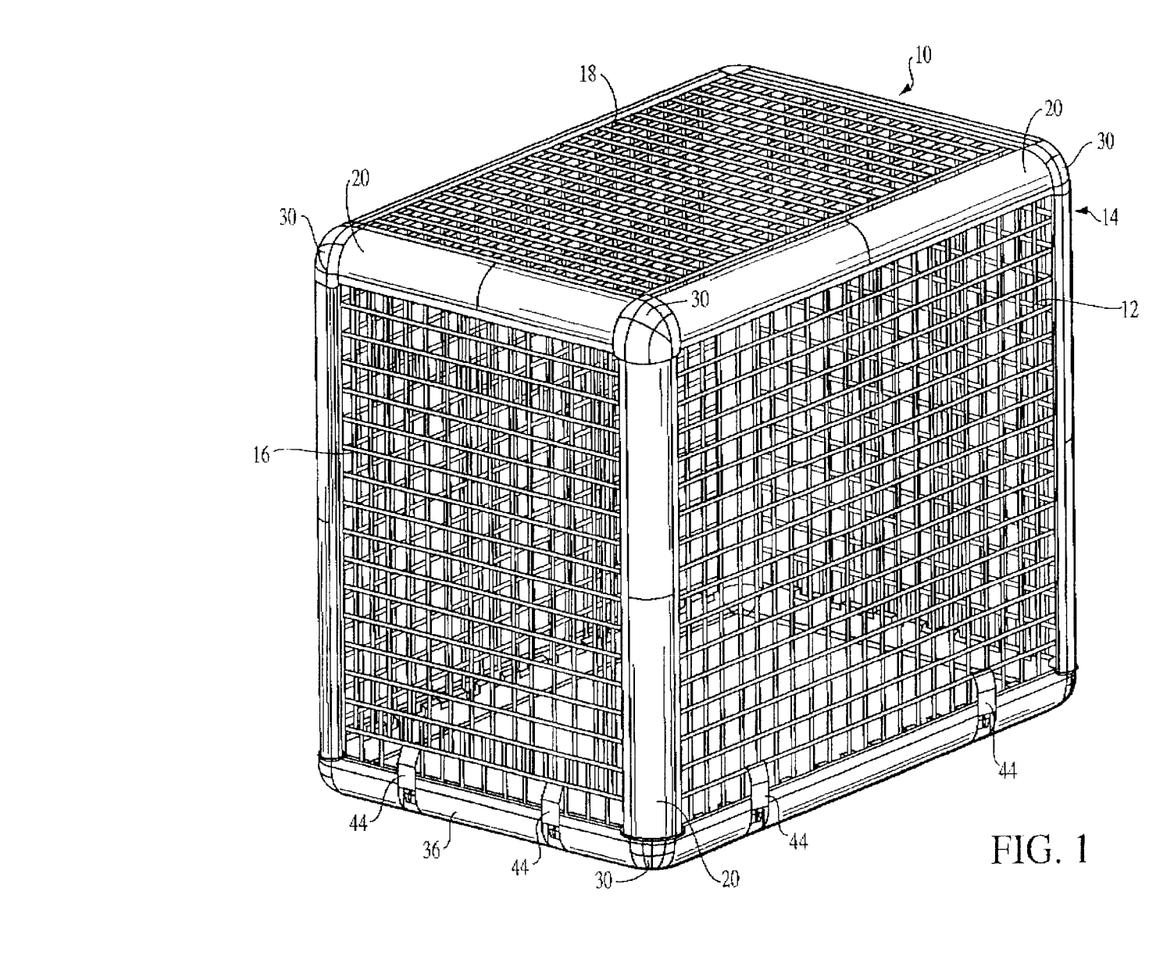
FIG. 1 is a perspective view of the assembled animal crate.

As can be seen in FIG. 1, in the preferred embodiment, the side panel 12, end panels 14, 16 and top panel 18 are all constructed of metal wire rods formed into two layers. The bottom layer is comprised of approximately equal lengths of rods positioned in the same plane with each rod spaced approximately an equal distance from the two rods surrounding it. The top layer of wire rods is comprised of similarly positioned planer rods welded or otherwise appropriately attached to the bottom layer of rods so that each rod of the top layer is approximately perpendicular to each rod of the bottom layer. Thus, the two layers of rods form a grid pattern with two adjacent rods from the top layer and two adjacent rods from the bottom layer serving as the boundaries for the individual grids. The dimensions of the individual grids can be altered by changing the spacing between each rod on the top and bottom layers.

The gauge of the wire rods can vary depending upon the application of the crate 10. Generally, the strength, weight and cost of the wire rod increases as the gauge of the wire rod increases. In the preferred embodiment, the wire rods have a gauge such that the radius of the wire approximates, or is slightly smaller, than the radius of the locking recess 26 of the edge piece 20 described below.

The side panels 12, end panels 14, 16 and top panel 18 can be attached together by any appropriate means. As previously discussed, the intersection of these panels can frequently represent a weak point in the crate 10. This is especially true for collapsible and square-back crates as the component responsible for securing together the panels typically will not be permanent so that the crate can be disassembled and transported. As such, it may be prone to failure or otherwise releasing of the panels.

Any non-permanent method of fastening the panels together, however, must be able to withstand the stresses placed upon it by the animal attempting to escape the confines of the crate or merely seeking to explore its surroundings. Not only must the fastening method prevent the escape of the animal, it must also be able to resist partial failure which could result in injury to the animal. Typical methods of attaching the side panels, end panels and top panel of a crate together include welds, bands, screws and rods.

For the present invention, the side panels 12, end panels 14, 16 and top panel 18 are secured together through the use of edge pieces 20. As can be seen in FIG. 1, the unique edge pieces 20 run almost the entire length of the four vertical edges of the crate 10 as well as almost the entire perimeter of the top panel 18 of the crate 10. The edge pieces 20 are positioned at the intersection of the side panels 12 with the end panels 14, 16 and top panel 18 in addition to the intersection of the end panels 14, 16 and the top panel 18.

The edge pieces 20 can be formed of any appropriate material, such as a variety of plastics, in light of the applications of the edge pieces 20. The material should allow the edge pieces 20 to be flexible enough so that the pet owner can easily manipulate them when assembling and disassembling the crate 10. However, the edge pieces 20 must also be rigid enough to tightly secure the side panels 12, end panels 14, 16 and top panel 18 together and maintain that bond even under the potentially high stresses placed upon them by the animal. The edge pieces 20 must also resist degradation of the material due to fatigue, age, wear and actions of the animal, including scratching and chewing.

In the preferred embodiment, the edge pieces 20 are constructed of polypropylene through the process of extrusion. The edge pieces 20 can also be manufactured in a variety of colors and shapes.

As shown in FIG. 1, in the preferred embodiment, eight edge pieces 20 are used to secure the crate 10 together. The edge pieces 20 are used at the intersections of the side panels 12, end panels 14, 16 and top panel 18. In an alternate embodiment, the base 36 can be constructed in a fashion similar to the top panel 18 so that edge pieces 20 can then be used at the intersection of the side panels 12 and end panels 14, 16 with the base 36 to secure them all together.

The length of the edge pieces 20 can also be varied depending upon the size of the crate 10 and the size of the corner caps 30, as described below. In the preferred embodiment, the four vertical edge pieces 20 that are placed at the intersection of the side panels 12 and end panels 14, 16 are approximately twenty five inches long, the two edge pieces 20 that are placed at the intersection of the side panels 12 and the top panel 18 are approximately thirty one inches long, and the two edge pieces 20 that are placed at the intersection of the end panels 14, 16 and the top panel 18 are approximately twenty inches long.

As mentioned, the available crates will typically also include a "large" and "small" version, as well as possibly an "extra small" version. The length of the edge pieces 20 for these crates will vary accordingly. For the large crate, in the preferred embodiment the four vertical edge pieces 20 placed at the intersection of the side panels 12 and end panels 14, 16 are approximately twenty six inches long, the two edge pieces 20 placed at the intersection of the side panels 12 and the top panel 18 are approximately thirty eight inches long, and the two edge pieces 20 placed at the intersection of the end panels 14, 16 and the top panel 18 are approximately twenty two inches long.

For the small crate, in the preferred embodiment the four vertical edge pieces 20 placed at the intersection of the side panels 12 and end panels 14, 16 are approximately twenty inches long, the two edge pieces 20 placed at the intersection of the side panels 12 and the top panel 18 are approximately twenty five inches long, and the two edge pieces 20 placed at the intersection of the end panels 14, 16 and the top panel 18 are approximately sixteen inches long.

For the extra small crate, in the preferred embodiment the four vertical edge pieces 20 placed at the intersection of the side panels 12 and end panels 14, 16 are approximately sixteen inches long, the two edge pieces 20 placed at the intersection of the side panels 12 and the top panel 18 are approximately twenty one inches long, and the two edge pieces 20 placed at the intersection of the end panels 14, 16 and the top panel 18 are approximately fifteen inches long.

Figure 13:
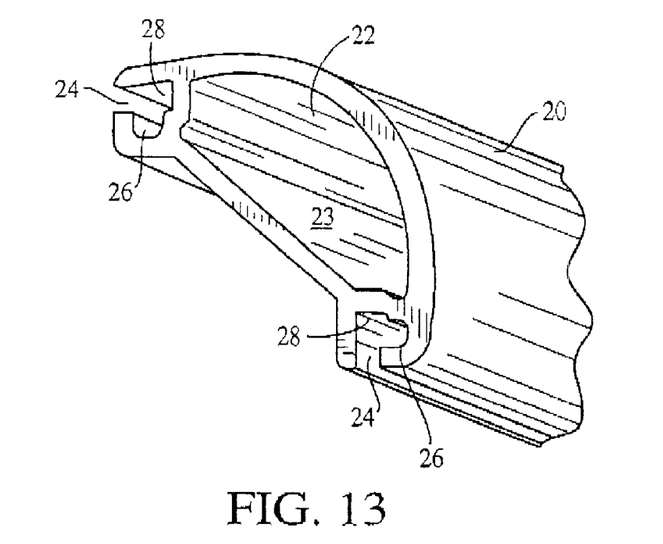
FIG. 13 is a partial perspective view of the edge piece of the invention.
Figure 14:
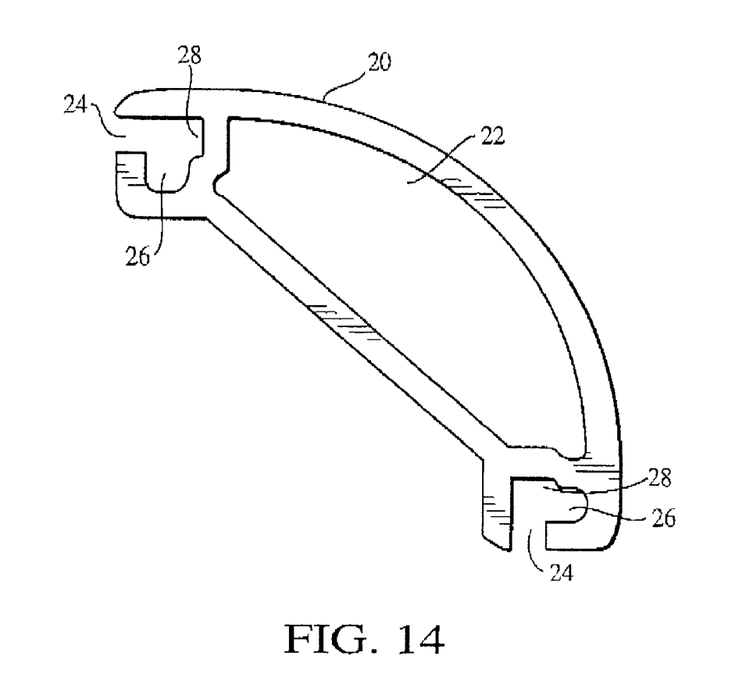
FIG. 14 is a side view of the edge piece of the invention.

FIGS. 13 and 14 show the edge piece 20 in detail. The shape of the edge pieces 20 can vary depending upon the functional attributes and appearance desired by the manufacturer and pet owner. Generally, however, the edge pieces 20 should be configured so that the interior surface is able to secure the side panels 12, end panels 14, 16 and top panel 18 together without any parts being exposed to the animal. It is also desirable that the exterior of the edge pieces 20 are aesthetically appealing without any material unnecessarily protruding so as to minimize the space requirement of the edge pieces 20 as well as avoiding the potential for injury due to contact with any exposed parts.

In the preferred embodiment, the edge piece 20 is comprised of a central channel 22 that runs the entire length of the edge piece 20. The channel 22 has a generally flat interior surface 23 that faces the crate 10 and a generally elliptical exterior surface that faces outward from the crate 10.

In the preferred embodiment, the channel 22 is hollow. This reduces the overall weight of the edge piece 20 and provides the edge piece 20 with the flexibility necessary to bend around the center of the channel 22 so that the edge piece 20 can be attached to, and removed from, the side panels 12, end panels 14, 16 and top panel 18 of the crate 10.

The thickness of the walls surrounding and defining the channel 22 can be varied depending upon the application. Increasing the thickness of the walls of the channel 22 reduces the flexibility of the channel 22. In the preferred embodiment, the walls of the channel 22 are approximately 0.125 inches thick.

Positioned at opposing ends of the channel 22 are locking mechanisms that run the entire length of the edge piece 20 and that secure the side panels 12, end panels 14, 16 and top panel 18 together. The locking mechanisms include a conduit 24. One end of the conduit 24 is open for receiving one of the rods from the side panels 12, end panels 14, 16 or top panel 18. The conduit 24 directs the rod to a locking recess 26. A wall 28 located between the conduit 24 and the channel 22 seals the end of the conduit 24 opposite the opening and prevents the rod from passing beyond the recess 26.

This recess 26 is desirably configured to mate with the rod and prevent the rod from unintentionally exiting the edge piece 20. In the preferred embodiment, one end of the recess 26 is in communication with the conduit 24 while the section of the recess 26 opposite the conduit 24 is generally arc shaped to receive and hold the rod. The radius of this section of the recess 26 can be varied to conform to the size of the rod. In the preferred embodiment, the receiving portion of the recess 26 has a radius of approximately 0.08 inches.

As can be seen in FIG. 14, the opposing recesses 26 of an edge piece 20 are approximately orientated at a ninety degree angle from one another. Furthermore, one of the recesses 26 is orientated so that the rod, when positioned within, is biased towards the crate 10, while the other recess 26 is orientated so that the rod, when positioned within, is biased away from the crate 10. This arrangement causes the side panels 12, end panels 14, 16 and top panel 18 to remain secure within the edge pieces 20 and the edge piece 20 to resist the stresses placed upon it by the contained animal. It also results in a minimal amount of the edge piece 20 being on the interior of the crate 10 and exposed to the animal. Thus, the animal is unable to chew on or otherwise effect the recesses 26 or edge pieces 20 generally.

Also in the preferred embodiment, the channel 22 extends partially into the base of the wall 28 near the arched portion of the recess 26. This configuration enhances the flexibility of the wall 28 and accordingly, the entire edge piece 20, thereby amplifying the ability of the edge piece 20 to bend and secure the side panels 12, end panels 14, 16 and top panel 18.

As can be seen in FIG. 1, the use of the edge pieces 20 leaves the corners of the crate 10 exposed where the side panels 12, end panels 14, 16 and top panel 18 intersect. While in one embodiment of the invention, these corners could be left uncovered, such an arrangement leads to the potential for injury as the corners of the side panels 12, end panels 14, 16 and top panel 18 could be sharp. Leaving the corners of the crate 10 exposed also detracts from the appearance of the crate 10. Thus, it is desirable for the corners of the crate 10 to be covered.

As the edge pieces 20 adequately secure together the side panels 12, end panels 14, 16 and top panel 18, any covers for the corners of the crate 10 are not required to provide further support. Nor is it necessary for the covers for the corners to be resolutely affixed to the crate 10. It is, however, desirable for the covers for the corners to be anchored to the crate 10 in a manner that prevents them from becoming easily dislodged.

Figure 15:
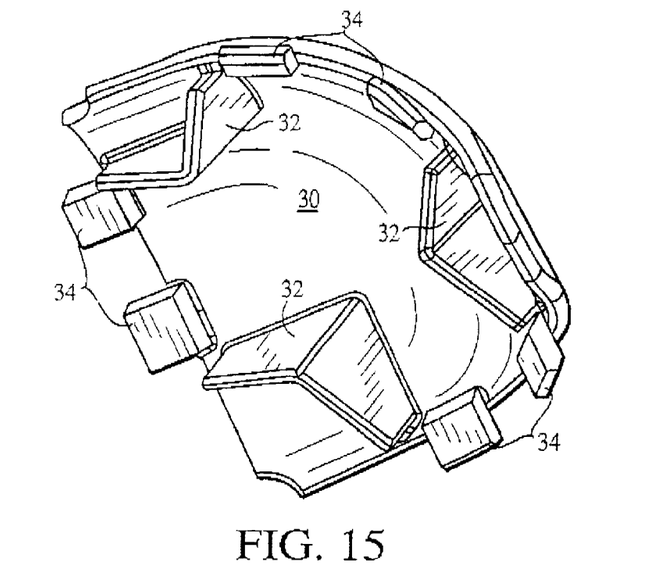
FIG. 15 is a perspective view of the corner cap of the invention.
Figure 16:
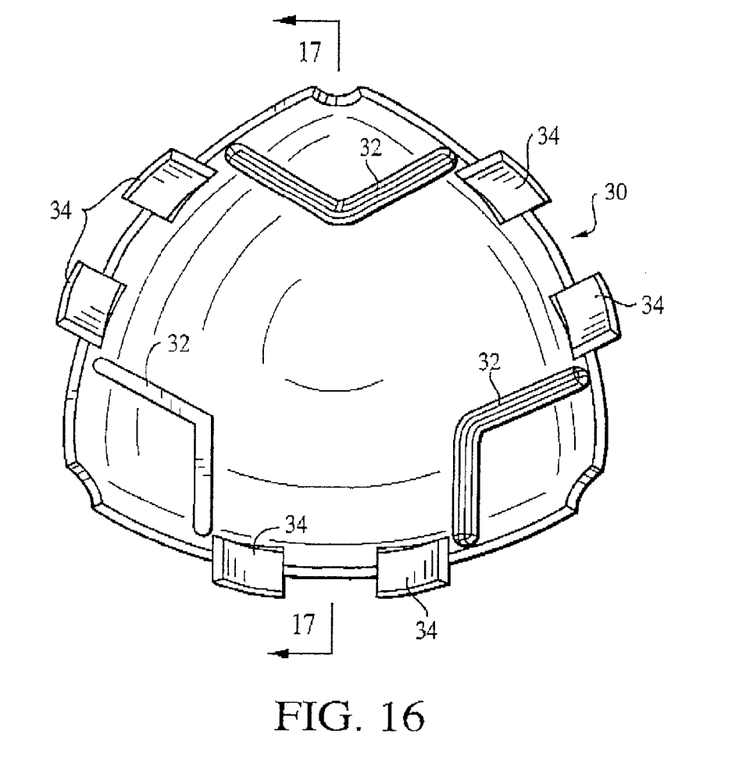
FIG. 16 is a front view of the corner cap of the invention.
Figure 17:
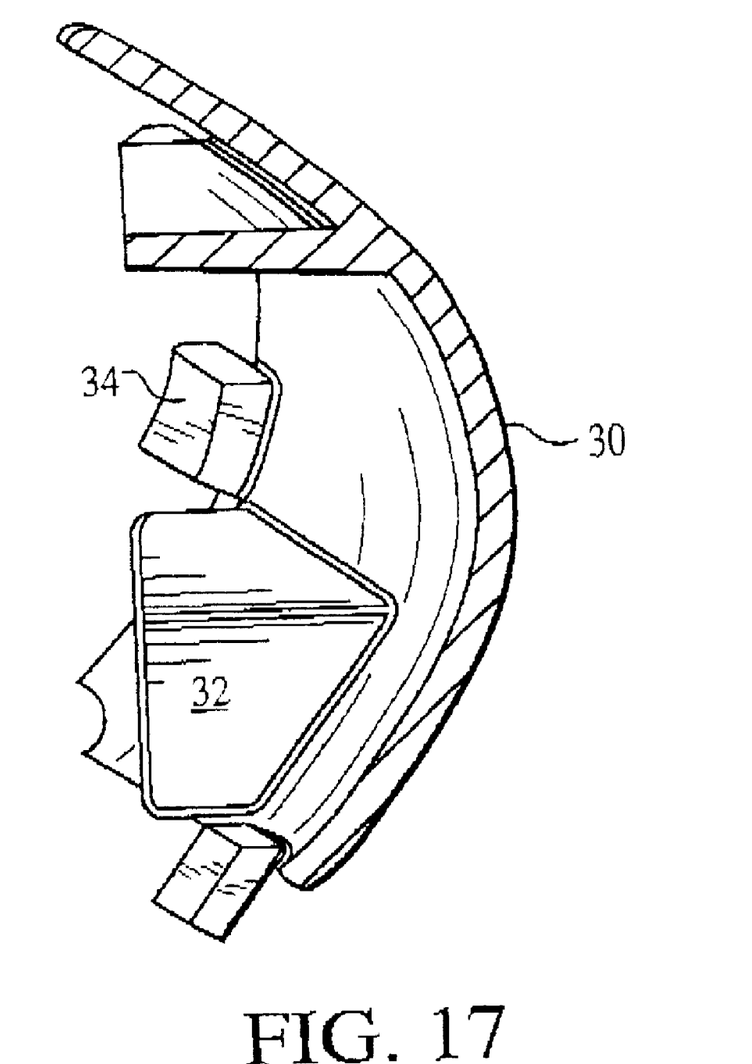
FIG. 17 is a cross sectional view of the corner cap of the invention taken along line 17—17 of FIG. 16.

As shown in FIGS. 1, 15 and 16, in the preferred embodiment, corner caps 30 are positioned between the edge pieces 20. Like the edge pieces 20, the corner caps 30 can be constructed of a variety of materials and in a variety of shapes. As the corner caps 30 do not have to provide additional support for securing the side panels 12, end panels 14, 16 and top panel 18 together, if desired, the choice of materials for the corner cap 30 does not have to be dictated solely by material with high rigidity and strength. However, the corner caps 30 must be pliable enough to be bent by the pet owner and placed on the crate 10 and must be able to remain on the crate 10 when subjected to the normal stresses encountered by the crate 10. In the preferred embodiment, the corner caps 30 are constructed of polypropylene and dyed to match the color of the edge pieces 20.

The wall thickness of the corner caps 30 can also be varied as desired. In the preferred embodiment, the wall thickness of the corner caps 30 approximates that of the edge pieces 20 so that the seal between the corner caps 30 and edge pieces 20 is smooth.

The most practical shape of the corner caps 30 will be dictated primarily by the length and shape of the edge pieces 20 as the corner caps 30 will have to fit snuggly at the intersection of three edge pieces 20. As shown in FIGS. 15 and 16, in the preferred embodiment, the corner caps 30 are generally shaped as a three-sided portion of a sphere. The corner caps 30 are configured so that, when placed on the crate 10, one of the sides of the corner cap 30 communicates with one of the edge pieces 20 that meets at each intersection of the side panels 12, end panels 14, 16 and top panel 18.

Although in the preferred embodiment, a corner cap 30 is used at each of the four corners at the top of the crate 10, in an alternate embodiment, corner caps 30 could be used at all eight corners of the crate 10. In such an embodiment, the base 36 of the crate 10 would be reconfigured accordingly.

The corner caps 30 can be secured to the crate 10 and/or edge pieces 20 through a variety of methods. For instance, the corner caps 30 could include circular extensions that encompass at least one of the rods of each of the side panel 12, end panel 14, 16 and top panel 18. Alternatively, the edge pieces 20 and corner caps 30 could have related male and female parts that mate together. In the preferred embodiment, the corner caps 30 are attached to the corners of the crate 10 through two sets of extensions. One set of extensions interacts with the side panels 12, end panels 14, 16 and top panel 18 while the other set of extensions interacts with the edge pieces 20.

FIGS. 15 and 16 detail the design of the corner caps 30. In the preferred embodiment, each of the three rims of the corner cap 30 contains a set of adjacent pins 32. The pins 32 are positioned towards the center of the rim with the distance from the nearest tip of each rim to the pin 32 being approximately equal.

Although the pins 32 could be of any appropriate shape, in the preferred embodiment, each pin 32 is generally rectangular in shape. Also in the preferred embodiment, the pins 32 are sloped to match the curvature of both the rim of the corner cap 30 and the edge pieces 20.

Each set of pins 32 in intended to interlock with a corresponding edge piece 20. The pins 32 represent a continuation of the rim of the corner cap 30. The spacing, size and shape of the pins 32 allows them to be inserted into the edge pieces 20 for securing the corner caps 30 to the crate 10. Each set of pins 32 extends outwardly from the rim in a planer direction that is generally parallel with the plane of the interior surface 23 of the channel 22 of the edge piece 20 corresponding to the particular set of pins 32. The ends of the pins 32 are desirably sloped to assist in the insertion of the pins 32 into the edge piece 20.

In the preferred embodiment, each corner cap 30 also includes three tabs 34 equally spaced around the interior perimeter of the corner cap 30. A rod from the side panel 12, end panel 14, 16 and top panel 18 meet at each corner of the crate 10. Each tab 34 is in communication with at least one of these rods when the corner cap 30 is inserted onto the corner of the crate 10 in between the edge pieces 20. Each tab 34 desirably compresses against its corresponding rod when the tabs 34 contact the rods.

As the tabs 34 desirably interact with the rods of the side panels 12, end panels 14, 16 and top panel 18 they can be any appropriate shape and size that accomplishes this objective. In an alternate embodiment, the tabs 34 could be generally rectangular or circular protrusion. In the preferred embodiment, however, the tabs 34 extend outwardly from the interior surface of the corner cap 30 in two sections. The sides of each section of a tab 34 extend from the surface of the corner cap 30 in a generally parallel fashion to each other. Additionally, the external edge of the section is generally perpendicular to each side. Thus, the sides of each section of the tab 34 are unequal while the internal edge of the section adjacent to the corner cap 30 is sloped to match the general slope of the corner cap 30.

The two sections of the tab 34 are joined together at an obtuse angle. Also in the preferred embodiment, each tab 34 extends outwardly from the interior of the corner cap 30 in a planer direction that is generally perpendicular to the plane of the interior surface 23 of the channel 22 of the edge piece 20 corresponding to the particular tab 34.

Thus, each tab 34 is compressed against one of the rods in either the side panel 12, end panel 14, 16 or top panel 18 when the corner cap 30 is inserted into the corner of the crate 10. The compression of the tabs 34 serves to bias the corner cap 30 outwardly and causes the interlocking of the pins 32 to the edge pieces 20. The configuration of the tabs 34 also promotes their pliability by allowing the tabs 34 to bend around the intersection of the two sections of the tab 34. This, in turn, permits the pet owner to secure the corner cap 30 to the corner of the crate 10 in an easy fashion.

Secured to the bottom of the crate 10 is a base 36. The base 36 can serve a variety of functions in an animal crate including acting as a floor for the crate 10, a basin for collecting the waste of the animal and a resting area for the animal. In one embodiment, the base 36 comprises a one-piece basin. In an alternate embodiment, the base 36 is configured in a grid-like fashion similar to the top panel 18. If desired, the pet owner can then place a basin underneath the crate 10. In the preferred embodiment, however, the base 36 includes a tray 38 that rests in the base 36. The tray 38 incorporates a grid pattern that allows for fur and other waste materials from the animal to fall through and collect in the base 36. This arrangement eases the cleaning required of the pet owner but also allows the pet owner to dispense with the use of the tray 38, if desired.

The base 36 is configured to correspond to the dimensions of the crate 10 while the tray 38 is configured to fit snugly within the base 36. Both the base 36 and the tray 38 can be manufactured from a variety of materials, such as metal, plastic or wood. In the preferred embodiment, both the base 36 and tray 38 are made of polyethylene. This provides the base 36 and tray 38 with the necessary stiffness, strength and durability to properly support and maintain an animal.

Figure 2:
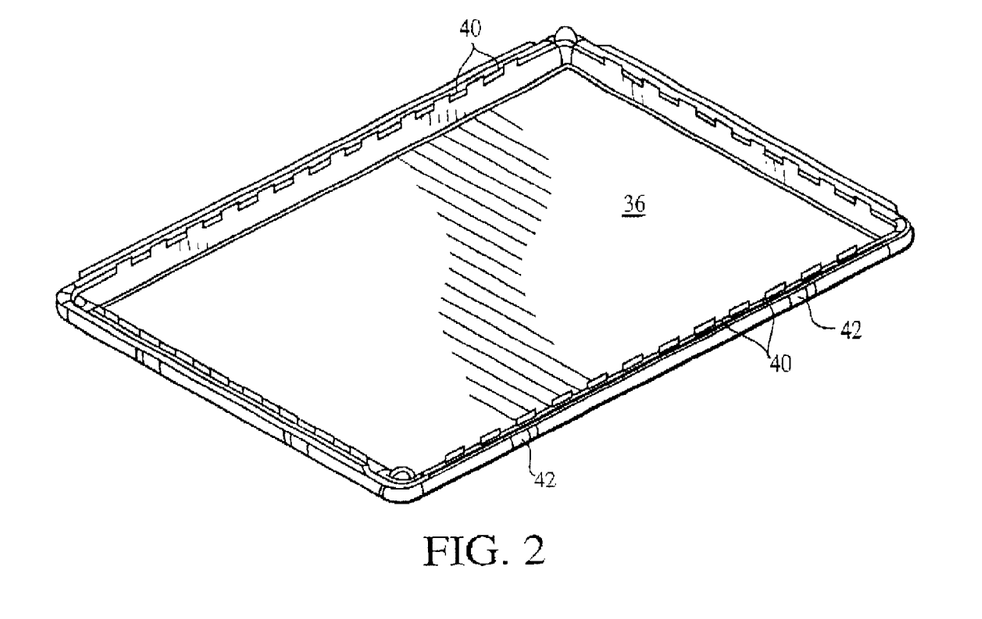
FIG. 2 is a perspective view of the base of the invention.

As shown in FIG. 2, in the preferred embodiment, the base 36 includes notches 40 around its entire perimeter. The notches 40 are configured to receive the bottoms of the rods of the side panels 12 and end panels 14, 16. Thus, the length of the notches 40 corresponds to approximately match the distance between the rods in one layer of the side panels 12 and end panels 14, 16. The side panels 12 and end panels 14, 16 rest in the notches 40 and are supported by the base 36.

As mentioned, a tray 38 can also be used with the base 36. In such an arrangement, the tray 38 includes a lip that runs around the entire perimeter. The dimensions of the tray 38 are coordinated so that the perimeter of the tray 38 contacts the inside perimeter of the base 36. This arrangement prevents the animal from being able to obtain a hold on the edge of the tray 38 with its mouth. Such a hold would allow the animal to chew on the tray 38 and potentially remove a piece of the tray 38 that could cause the animal to choke.

Similarly, in the embodiment where only the base 36 is used, the depth of the notches 40 is desirably sufficient so that the outside rim of the base 36 extends behind the ends of the rods. The front of the notch 40 includes a ridge that extends upwards. This prevents a gap from developing between the top of the base 36 and the bottom of the rods of the side panels 12 and end panels 14, 16 so that the animal cannot obtain a hold on the base 36 or possibly get its paw or head caught between the base 36 and the side panels 12 or end panels 14, 16.

Also in the preferred embodiment, the tray 38 includes a grid pattern that allows for the pass through of waste generated by the animal. The grids can be of any appropriate size depending upon the size of the animal housed by the crate 10. While larger grids allow larger waste material to fall through, the grids should as small as practical so that the animal is not uncomfortable or frightened when walking over the pattern.

The base 36 can be secured to the bottom of the crate 10 in any appropriate manner, including the use of screws,- nails, rods and other typical attachment devices. The attachment device, however, desirably allows the base 36 to be relatively quickly and easily removed and reattached. It must also prevent the animal from escaping the crate 10 as well as from loosening or chewing on a portion of the device.

In the preferred embodiment, the base 36 is attached to the bottom of the side panels 12 and end panels 14,16 through the use of clips 44. The base 36 desirably includes holds 42 to which the clips 44 are attached. The holds 42 are located underneath the external rim of the base 36 and are spaced uniformly around the base 36. Any appropriate number of holds 42 can be used, but desirably, two holds 42 are placed on each side of the base 36.

Figure 11:
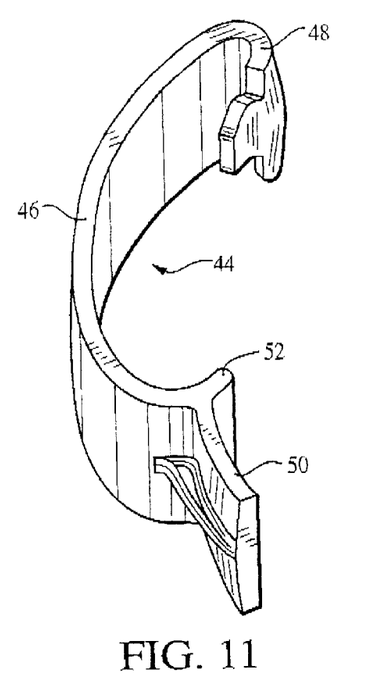
FIG. 11 is a perspective view of the clip of the invention.
Figure 12:
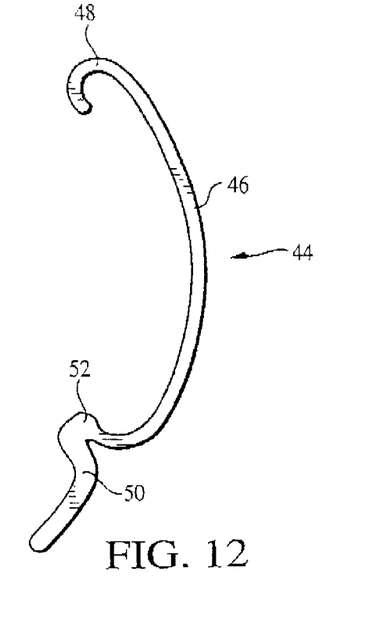
FIG. 12 is a side view of the clip of the invention.

As shown in FIGS. 11 and 12, the clip 44 is comprised of a C-shaped back 46 with a hook 48 near the top of the clip 44 and a tail 50 near the bottom of the clip 44. The tail 50 extends downwardly at an angle from the base of the clip 44. At the intersection of the base of the clip 44 and the top of the tail 50 rests a ridge 52. The tail 50 of the clip 44 is configured to rest within the hold 42 of the base 36 so that the ridge 52 interlocks with the top of the hold 42.

The hook 48 at the top of the back 46 of the clip 44 curls inward towards the tail 50 of the clip 44. The diameter of the hook 48 is sufficient to fit around a rod in the side panels 12 or end panels 14, 16.

The clip 44 can be constructed of a variety of materials that provide strength, durability and flexibility. The clip 44 desirably must be pliable enough so that the hook 48 can be stretched over and around a lower rod of a side panel 12 or end panel 14, 16 while the ridge 52 is secured in the hold 42 of the base 36. The clip 44 must also desirably be strong enough so that it can withstand such repeated stretching without breaking and rigid enough so that it does not sag when in the locked position. The profile of the clip 44 must also be such that as little as possible is available for the animal inside the crate 10 to reach and possibly chew on.

Figure 3:
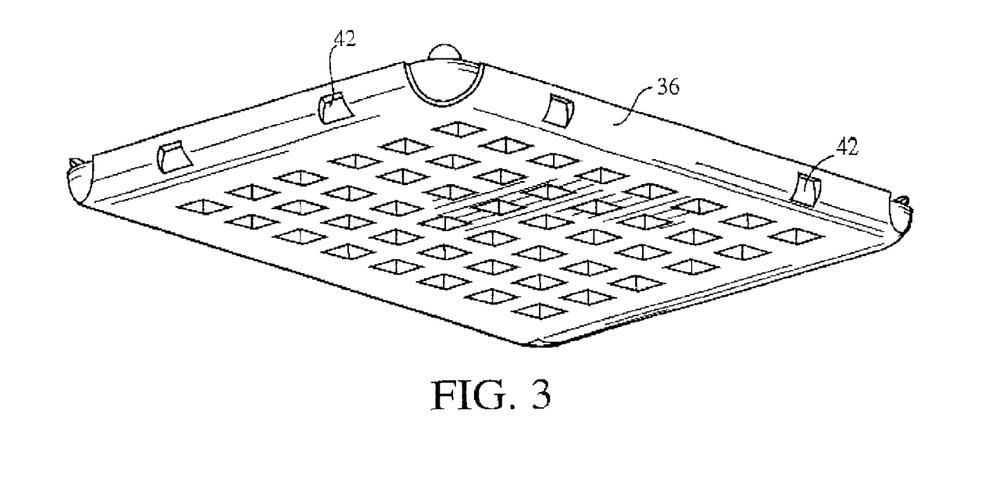
FIG. 3 is a perspective view of the base of the invention for use in an alternative embodiment of the invention.
Figure 4:
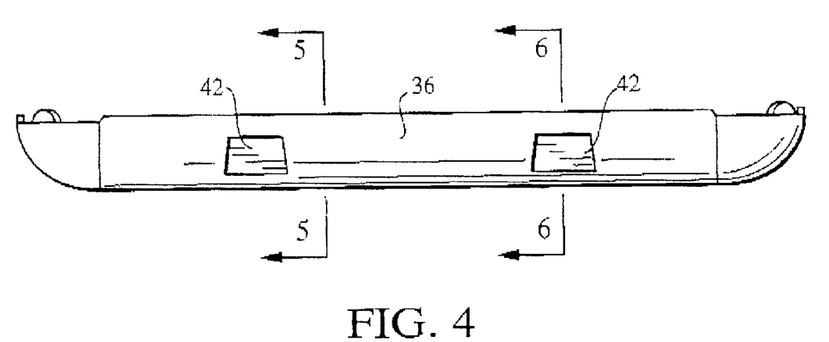
FIG. 4 is a front view of the base of the invention.
Figure 5:
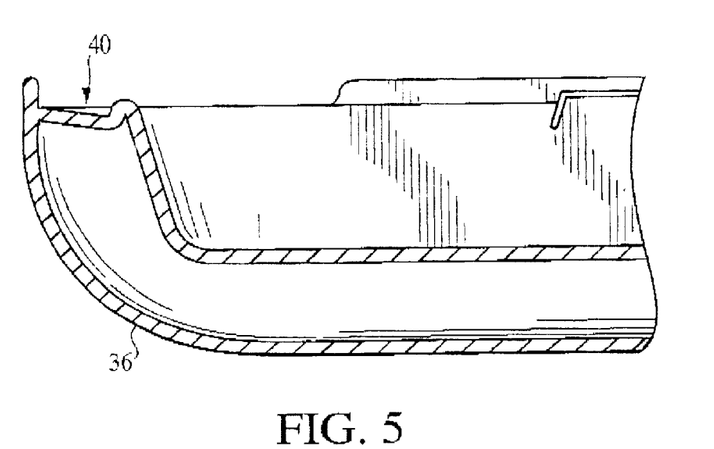
FIG. 5 is a cross sectional view of the base of the invention taken along line 5—5 of FIG. 4.
Figure 6:
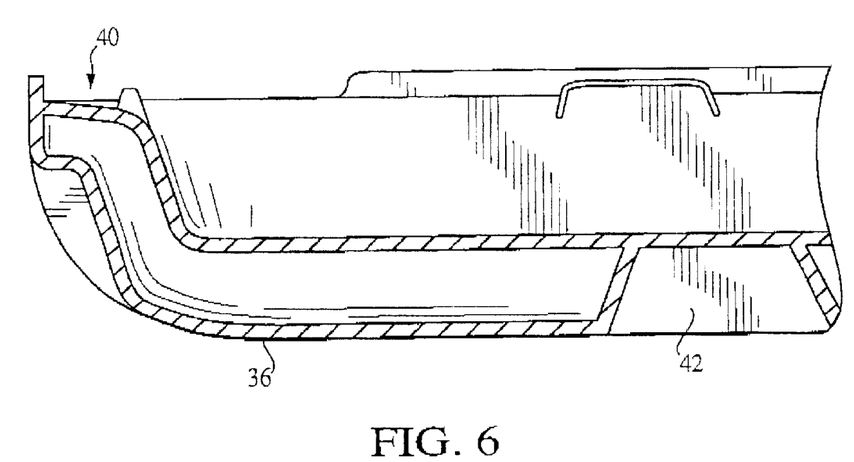
FIG. 6 is a cross sectional view of the base of the invention taken along line 6—6 of FIG. 4.
Figure 7:
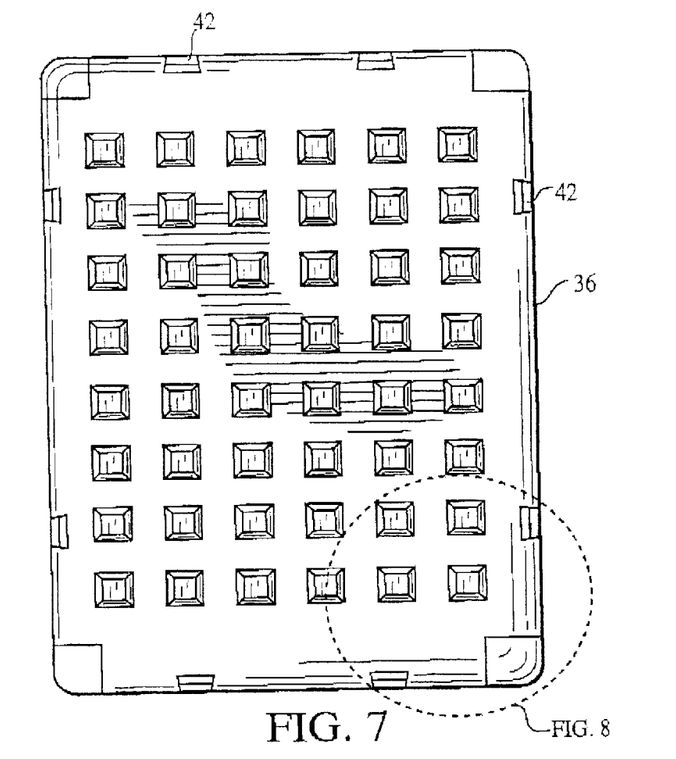
FIG. 7 is a top view of the base of the invention.
Figure 8:
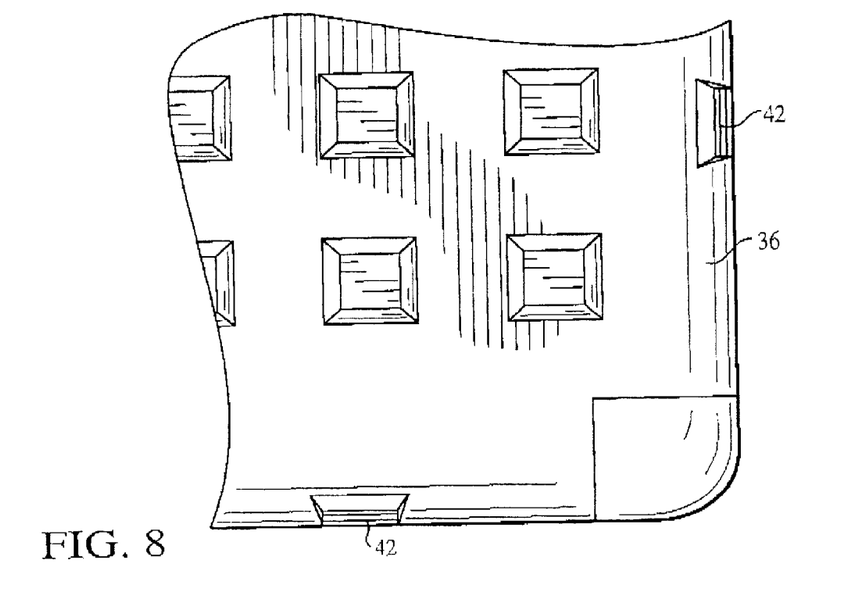
FIG. 8 is an exploded view of the corner of the base of the invention.
Figure 9:
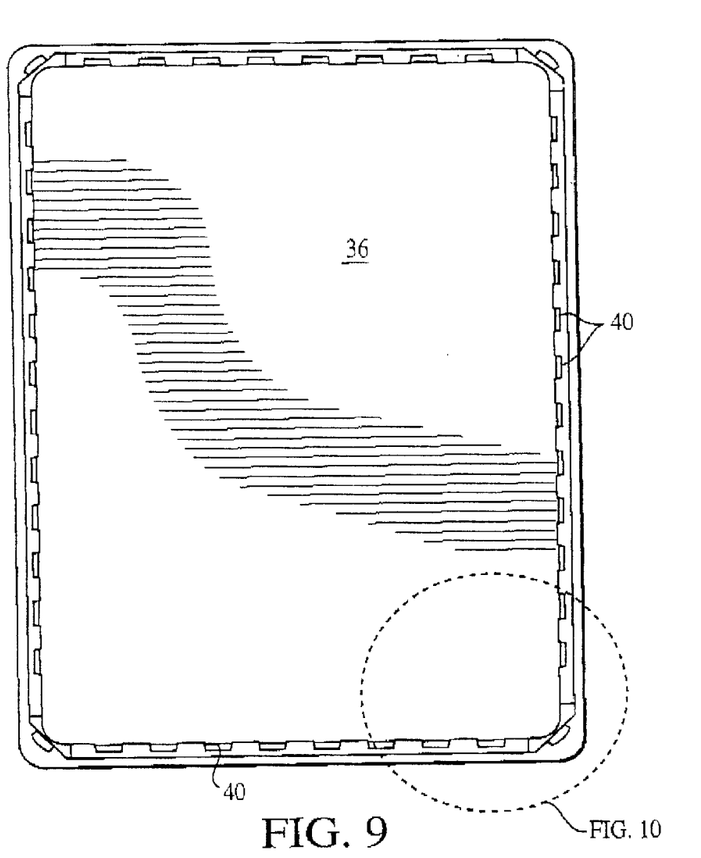
FIG. 9 is a top view of the base of the invention.
Figure 10:
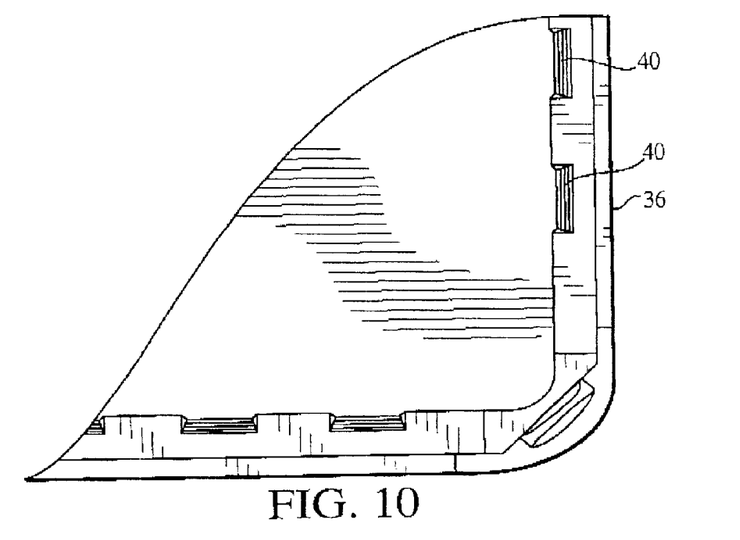
FIG. 10 is an exploded view of the corner of the base of the invention.

In an alternate embodiment, the base 36 can be configured so that it can receive corner caps 30 at each of its corners. For such a configuration, the curved portions of the base 36 between the corner caps 30 would have an appropriate profile.

Any crate must also have a door for the animal to be placed into, and taken out of, the crate. The door is typically located on one of the sides or ends of the crate. In one possible embodiment, the door is located on the top of the crate. While this arrangement may hinder the animal's attempts to escape from the crate, it increases the difficulty of removing the animal as well.

In the preferred embodiment, the door is located on one of the end panels 16. The door is hinged to the end panel 16 so that it swings outwardly away from the inside of the crate 10. The door can be constructed in a variety of fashions and from different materials. In the preferred embodiment, the door is constructed from wire rods in a manner similar to the side panels 12, end panels 14, 16 and top panel 18. The door includes a latch for securing the door to the crate 10 in the closed position.

The latch desirable should be able to withstand manipulation by the animal but also allow the pet owner to unlock and open the door easily and in a straight forward manner. It is also desirable for the latch to be constructed so that the pet owner can open it with only one hand.

The latch can be of any appropriate material and configuration. Typically, the latch will include means for attaching the latch to the door while the face of the latch is desirably configured to allow the pet owner to easily grasp and activate it. In one embodiment, the latch consists of a cam lock.

In the preferred embodiment, the door extends beyond the opening in the end panel 16 so that the wire rods of the door overlap the wire rods of the end panel 16. The latch can then be attached to the door at a position where the door overlaps the end panel 16. This allows the latch to engage one of the wire rods of the end panel 16 to lock the door.

The design of the present invention allows the pet owner to easily and quickly assemble and disassemble the crate 10. In actual applications, the pet owner may receive the crate 10 with various portions of the crate 10 already constructed. For illustrative purposes, the complete assembly and disassembly of the crate 10 will be described.

In use, the crate 10 can be easily assembled by the pet owner. First, the side panels 12, end panels, 14, 16 and top panel 18 are secured together through the use of the edge pieces 20. This is accomplished, for example, by inserting the wire rod at one end of the side panel 12 into the locking recess 26 of the appropriate vertical edge piece 20. The wire rod at one end of the end panel 14 is then inserted into the other locking recess 26 of the same edge piece 20.

This procedure is then repeated for the vertical edge piece 20 connecting the other end of the side panel 12 to the other end panel 16 and for connecting the other side panel 12 to both end panels 14,16. As the crate 10 begins to take shape, there will be less maneuvering room for inserting the wire rods into the locking recesses 26 of the edge pieces 20. The flexibility of the edge pieces 20 allows the pet owner to accomplish these tasks by squeezing or bending the edge pieces 20 as necessary until the wire rods are locked into the recesses 26.

After the side panels 12 and end panels 14, 16 are secured together, the top panel 18 can then be secured to the side panels 12 and end panels 14,16 in a similar manner. Once all of the panels are secured together, the crate will maintain its structure. The tension exerted on the edge pieces 20 by the side panels 12, end panels 14, 16 and top panel 18 work to prevent any of the rods from being released by the locking recesses 26.

Once all of the panels are secured together, the four corner caps 30 can be attached to the corners of the crate 10 by compressing the corner caps 30 and applying them to the corners so that the tabs 34 contact the wire rods of the side panels 12, end panels 14, 16 and top panel 18 and the pins 32 are inserted into the edge pieces 20. The corner caps 30 will then rest snugly at the corners of the crate 10.

The base 36 can then be attached to the crate 10 by placing the clips 44 into the holds 42 of the base 36 and stretching the clips 44 up and over the rods at the bottom of the side panels 12 and end panels 14, 16 until the hooks 48 engages the rods. If desired, a tray can be placed on top of the base 36. Corner caps 30 can then be attached to the four corners of the base 36.

If not already attached, the latch can be attached to the door by the appropriate attachment means. The latch can be engaged and the door locked by closing the door and activating the latch mechanism.

The crate 10 is disassembled by reversing the above procedure. The clips 44 can be released by exerting pressure on the back 46 of the clip 44 while pulling up on the tail 50. The corner caps 30 are removed by squeezing them to draw the pins 32 away from the edge pieces 20 and pulling the corner caps 30 away from the corners of the crate 10. The initial edge piece 20 is removed by squeezing or otherwise compressing it until the side panels 12, end panels 14,16 or top panel 18 can be removed. The side panels 12, end panels 14,16 and top panel 18 can then easily be removed from the edge pieces 20 as well.

While a preferred embodiment of the present invention has been described, it should be understood that various changes, adaptations and modifications may be made therein without departing from the spirit of the invention and the scope of the appended claims.

What is claimed:

1. An animal crate for housing and training an animal, comprising:
   at least two generally parallel side panels;
   at least two generally parallel end panels, one end panel including an aperture and a door for sealing the aperture;
   a base removably attached to the bottom of the side panels and end panels;
   a top panel attached to the top of the side panels and end panels; and substantially the entire intersection between each panel.
   a plurality of integrally formed flexible edge pieces capable of manipulation having locking recesses formed along a length thereof, the locking recesses being configured for slidably receiving the end panels and side panels and forming intersections therebetween, and conduits unfigured to guide the end panels and side panels into the locking recesses;
   wherein the edge pieces are slidably positioned along substantially the entire intersection between each side panel with each end panel and each intersection of the top panel with each side panel or end panel, the edge pieces securing the side panels, end panels and top panel together along substantially the entire intersection between each panel.

2. The animal crate of claim 1 wherein the side panels, end panels and top panel are secured together in a removable fashion.

3. The animal crate of claim 2 wherein the locking recesses are configured for mating with a rod of the side panels, end panels or top panel.

4. The animal crate of claim 3 including a plurality of caps positioned between the edge pieces at the corners of the crate.

5. The crate of claim 4 wherein one of the end panels includes a latch for locking the door to the end panel.

6. The crate of claim 5 wherein the base is attached to the side panels and end panels through the use of clips that communicate with the bottom of the side panels and end panels.

7. The crate of claim 6 wherein the edge pieces are constructed each of a single component of extruded polypropylene so that the edge pieces are integrally molded and have a slim profile such that a minimum amount of material is positioned inside the crate.

8. The crate of claim 7 wherein the base includes a tray for conveying waste materials.

9. An animal crate for housing and training an animal, comprising:
   at least two generally parallel side panels;
   at least two generally parallel end panels, one end panel including an aperture and a door for sealing the aperture;
   a base removably attached to the bottom of the side panels and end panels;
   a top panel attached to the top of the side panels and end panels; and
   a plurality of integrally formed flexible edge pieces capable of manipulation having locking recesses formed along a length thereof, the locking recesses being configured for slidably receiving the end panels and side panels and forming intersections therebetween, and conduits configured to guide the end panels and side panels into the locking recesses;
   wherein the edge pieces are slidably positioned along substantially the entire intersection of each side panel with each end panel and the intersection of the top panel with each side panel or end panel, the edge pieces securing the side panels, end panels and top panel together, the edge pieces having a profile slim enough such that a minimum amount of each edge piece protrudes inside the crate.

10. An animal crate for housing and training an animal, comprising:
    at least two generally parallel side panels;
    at least two generally parallel end panels, one end panel including an aperture and a door for sealing the aperture;
    a base removably attached to the bottom of the side panels and end panels;
    a top panel attached to the top of the side panels and end panels; and
    a plurality of edge pieces constructed each of a single integrally molded component, each edge piece having a locking recess integrally molded along a length thereof, the locking recess being configured for slidably receiving end or side panels and forming an intersection therebetween, and a conduit configured to guide the end panel or side panel into the locking recess;
    wherein the edge pieces are slidably positioned along substantially the entire intersection between each side panel with each end panel and each intersection of the top panel with each side panel or end panel, the edge pieces securing the side panels, end panels and top panel together along substantially the entire intersection between each panel.

* * * * *